U S009522474B2

(12) United States Patent
Gallucci

(10) Patent No.: US 9,522,474 B2
(45) Date of Patent: Dec. 20, 2016

(54) DEVICE FOR SELECTIVE COLLECTING OF PORTIONS BY CUTTING FROM A SHEET ARRANGED ON A WORK PLANE

(76) Inventor: Giuseppe Gallucci, Monte Urano (IT)

( * ) Notice: Subject to any disclaimer, the term of this patent is extended or adjusted under 35 U.S.C. 154(b) by 366 days.

(21) Appl. No.: 14/126,475

(22) PCT Filed: Jun. 12, 2012

(86) PCT No.: PCT/IB2012/052966
§ 371 (c)(1),
(2), (4) Date: Mar. 3, 2014

(87) PCT Pub. No.: WO2012/172484
PCT Pub. Date: Dec. 20, 2012

(65) Prior Publication Data
US 2014/0165806 A1    Jun. 19, 2014

(30) Foreign Application Priority Data
Jun. 15, 2011   (IT) .................................. BO11A0344

(51) Int. Cl.
*B62D 7/18*     (2006.01)
*B26D 7/18*     (2006.01)
(Continued)

(52) U.S. Cl.
CPC .............. *B26D 7/18* (2013.01); *B25J 15/0616* (2013.01); *B26D 7/1863* (2013.01); *B26D 7/32* (2013.01);
(Continued)

(58) Field of Classification Search
CPC .. B65G 47/911; B25J 15/0658; B26D 7/1854; B26D 7/1863; Y10T 83/2185
(Continued)

(56) References Cited

U.S. PATENT DOCUMENTS 5,450,333 A    9/1995  Minami et al.
RE38,033 E  *  3/2003  Okonski ................ B26D 7/018
                                                  83/152
(Continued)

FOREIGN PATENT DOCUMENTS

DE         4409195 A1 *  9/1994  ............... B26D 3/10
DE     202009014154 U1 *  7/2010  ............. B65G 47/91
EP         0348311 A1    12/1989

OTHER PUBLICATIONS

International Search Report for PCT/IB2012/052966, mailed Oct. 4, 2013, 3 pages.

*Primary Examiner* — Kenneth E Peterson
(74) *Attorney, Agent, or Firm* — R. Neil Sudol; Henry D. Coleman

(57) ABSTRACT

A device for selective collecting of portions fashioned by cutting from a sheet arranged on a work plane (2), has a removing group (4) subdivided into sections having holes connected selectively either to an aspirating source (D) or a compressed-air source, an activator moving the removing group. A command and control device directs the activator, aspirating source and the compressed-air source, for connecting the aspirating source with at least a fraction of the holes facing the upper surface of a selected portion, and the compressed-air source (P) with a fraction of the holes facing an upper surface of a strip which delimits the outline of the selected portion to raise the removing group (4) with a consequent engaging of only the selected portion (R).

3 Claims, 6 Drawing Sheets

(51) Int. Cl.
  *B26D 7/32* (2006.01)
  *C14B 17/06* (2006.01)
  *C14B 5/00* (2006.01)
  *C14B 17/04* (2006.01)
  *B25J 15/06* (2006.01)

(52) U.S. Cl.
  CPC ................ *C14B 5/00* (2013.01); *C14B 17/04* (2013.01); *C14B 17/06* (2013.01); *B25J 15/0658* (2013.01); *B26D 7/1854* (2013.01); *Y10T 83/2185* (2015.04)

(58) Field of Classification Search
  USPC .......................................... 414/752.1; 83/152
  See application file for complete search history.

(56) References Cited

U.S. PATENT DOCUMENTS

| | | | | |
|---|---|---|---|---|
| 8,915,171 B2 * | 12/2014 | Gallucci | ................ | B26D 5/00 83/112 |
| 2001/0003936 A1 * | 6/2001 | Song | .................... | B26D 7/1854 83/24 |
| 2005/0226711 A1 * | 10/2005 | Schnoor | ............... | B25J 15/0616 414/736 |
| 2006/0082172 A1 | 4/2006 | Clark et al. | | |

\* cited by examiner

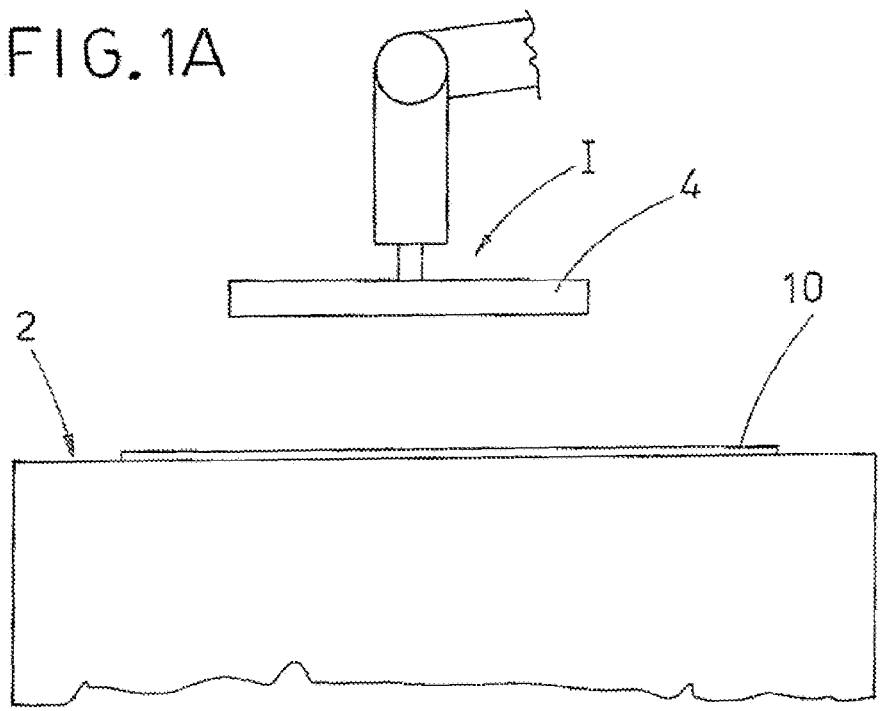
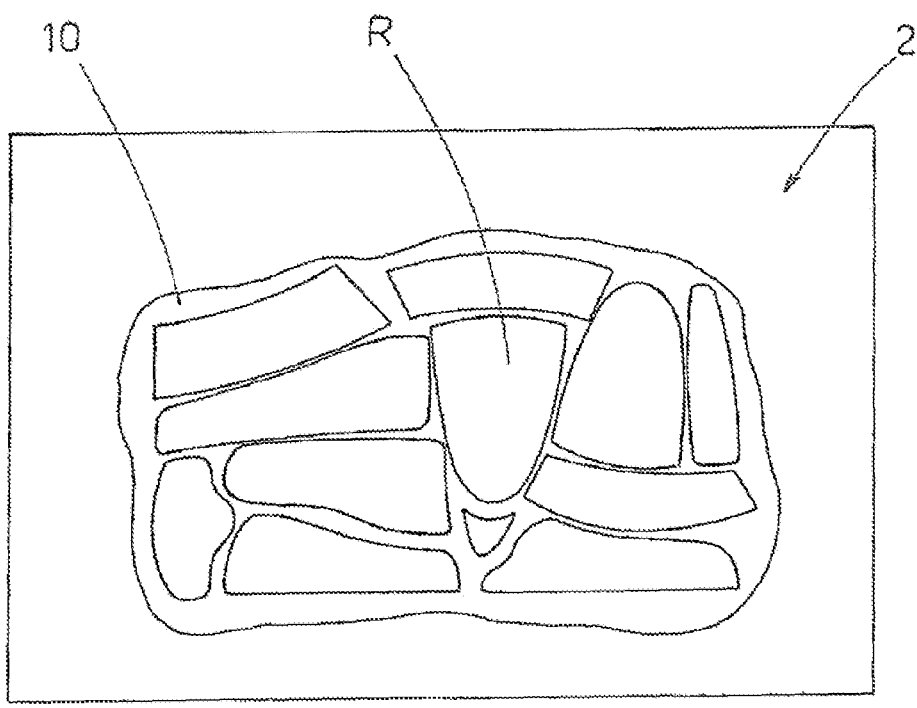

DEVICE FOR SELECTIVE COLLECTING OF PORTIONS BY CUTTING FROM A SHEET ARRANGED ON A WORK PLANE

FIELD OF THE INVENTION

The invention relates to the technical sector of portions removed by cutting from a sheet, for example a leather sheet, arranged on a work plane.

DESCRIPTION OF THE PRIOR ART

In order to be cut, leather is positioned resting on a work plane defined by a plate interested by holes that during a cutting operation are connectable to an aspirating source; thus the lower surface of the leather is subjected to an aspirating action such that during the cutting operation for obtaining a series of portions exhibiting predefined profiles and shapes that are different from one another, the leather Is maintained adheringly on the plate.

The portions obtained from the leather are then removed and/or selected manually by an operator and unloaded Into corresponding collection containers, following predefined ordering criteria.

The dimensions of the leather, in some cases, are such that the cut portions are not always easily accessible for the operator.

The operator, in fact, when extending his arm above the work plane, cannot always reach the cut portions from the centre of the leather, and therefore must either use means enabling him to collect those portions, or near the leather towards his work station, seeking to draw, with the displacement. also the non-accessible cut portions.

The above-described collection does not enable the cut portions to be unloaded from the work plane selectively, which leads to a subsequent operating stage aimed at enabling sub-division of the cut portions and unloading thereof into corresponding distinct containers.

The work plane can, in a variant, be defined by a belt, permeable to air, ring-wound such that the lower surface of the operating branch is in contact with the plate described above; to be cut, the leather is positioned resting on the upper surface of the operating branch of the belt.

The belt on which the cut leather is subsequently moved such as to enable advancing of the leather and unloading thereof, by force of gravity, of all the cut portions into a collection container.

In this case too an operator is required, who selects the cut portions accumulated in the collection container and unloads them into corresponding containers.

SUMMARY OF THE INVENTION

The objective of the invention is to provide a device for removing cut portions from a sheet arranged on a work plane, which enables selective collection of each cut portion independently of the position and profile thereof.

A further objective of the invention is to provide a device enabling selective removal of cut portions, from a work plane, and unloading thereof into corresponding containers, according to predefined ordering criteria.

A further objective of the invention is to provide a device for removing cut portions from a sheet which does not require use of an operator for removing the portions.

The above objectives of the invention are obtained according to the contents of the claims.

BRIEF DESCRIPTION OF THE DRAWINGS

The characteristics of the invention will be evidenced in the following, in which a preferred but not exclusive embodiment of the invention is described, of the device of the invention, with reference to the accompanying figures of the drawings, in which:

FIG. 1A illustrates a lateral view in larger scale of detail K of FIG. 1;

FIG. 2 is a view from above of the work plane which receives a sheet from which a series of portions of different size and profiles have been cut;

DESCRIPTION OF THE PREFERRED EMBODIMENTS

Figure 1:
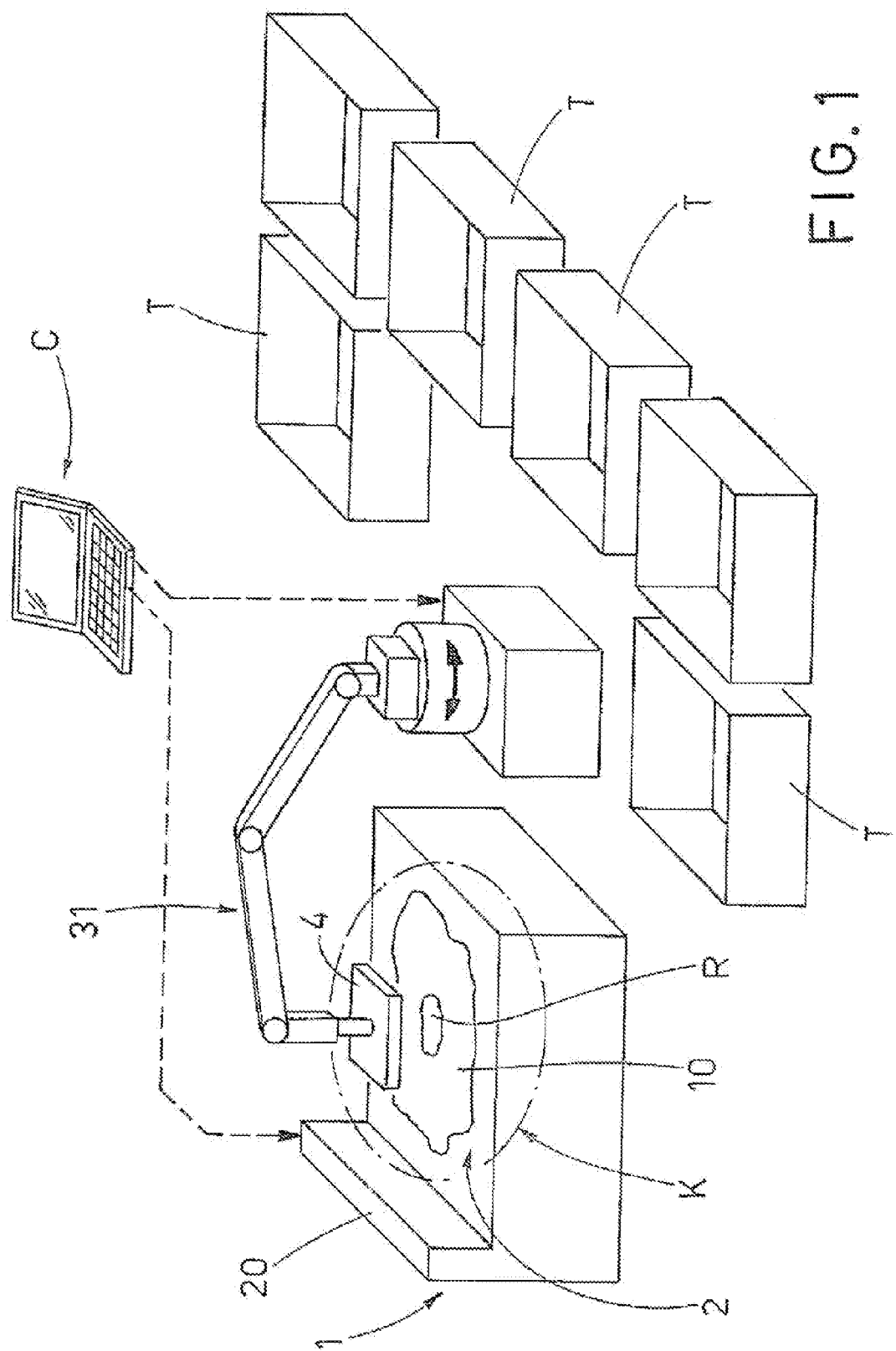
FIG. 1 is a schematic perspective view of the operating system of the proposed device.

With reference to the accompanying tables of drawings, 1 denotes a cutting unit comprising a work plane 2 which bears a mobile cutting head 20 which, according to known methods, cuts a sheet 10, for example a sheet of leather of any flat and flexible article, positioned resting on the work plane, such as to obtain, for example, a series of portions R having differing profiles and dimensions.

A removing group 4 is positioned superiorly of the work plane 2, which group 4 in the illustrated example is defined by a plate, for example arranged parallel with respect to the work plane, of dimensions that are not smaller than those of the widest portion cut from the sheet 10.

The removing group 4 is borne by a mobile manipulator 31, according to Cartesian axes x, y, z above the work plane 2 in order to position the removing group 4 superiorly of the selected portion to be removed, in order to engage it and unload it from the work plane 2 in one of the collection containers T located downstream of the cutting unit 1.

Figure 4:
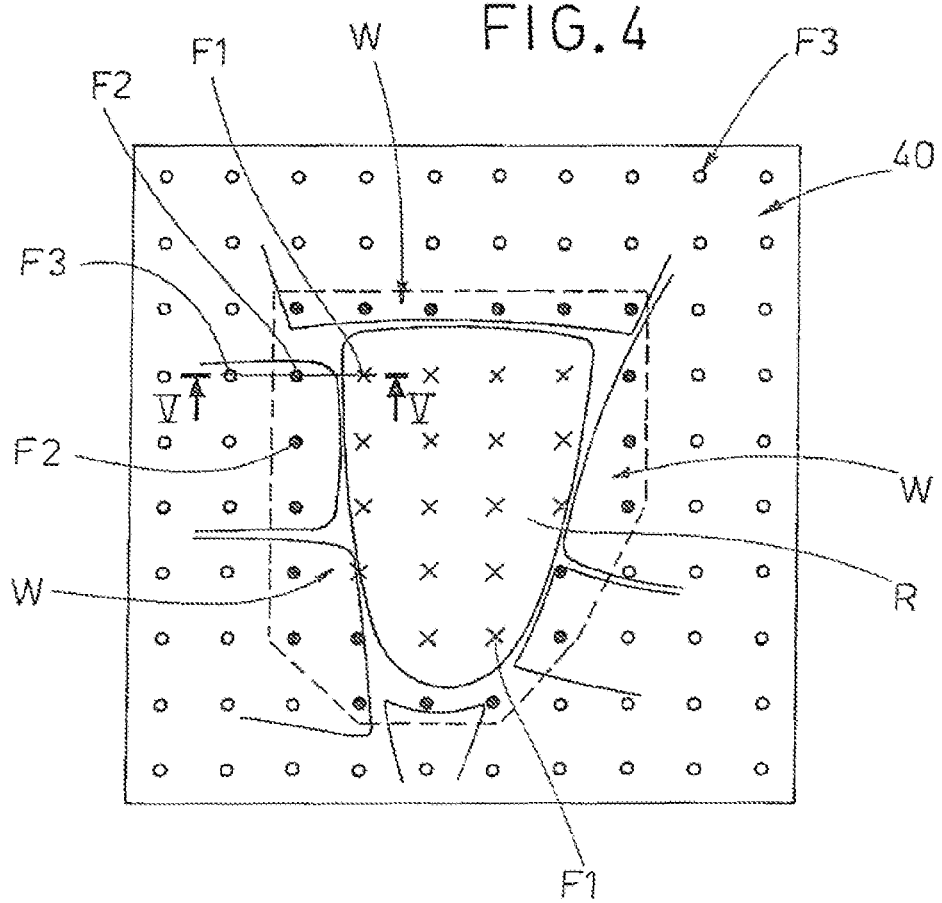
FIG. 4 is a view of section IV-IV of FIG. 3.

The lower surface 40 of the removal group 4, as illustrated in FIG. 4, is sub-divided into sections interested by holes opening into the lower surface and connectable either to an aspirating source D or a source of compressed air P.

The compressed-air source P, the aspirating source D and the means for moving the manipulator 31 are commanded by a command and control board C.

In the following a description will be made of the functioning of the device of the invention.

The leather 10 is positioned, using known methods, on the work plane 2, and subsequently, by means of activating the cutting head 20 in a known way, a series of portions R is obtained from the leather, for example having differing profiles and dimensions.

Figure 3:
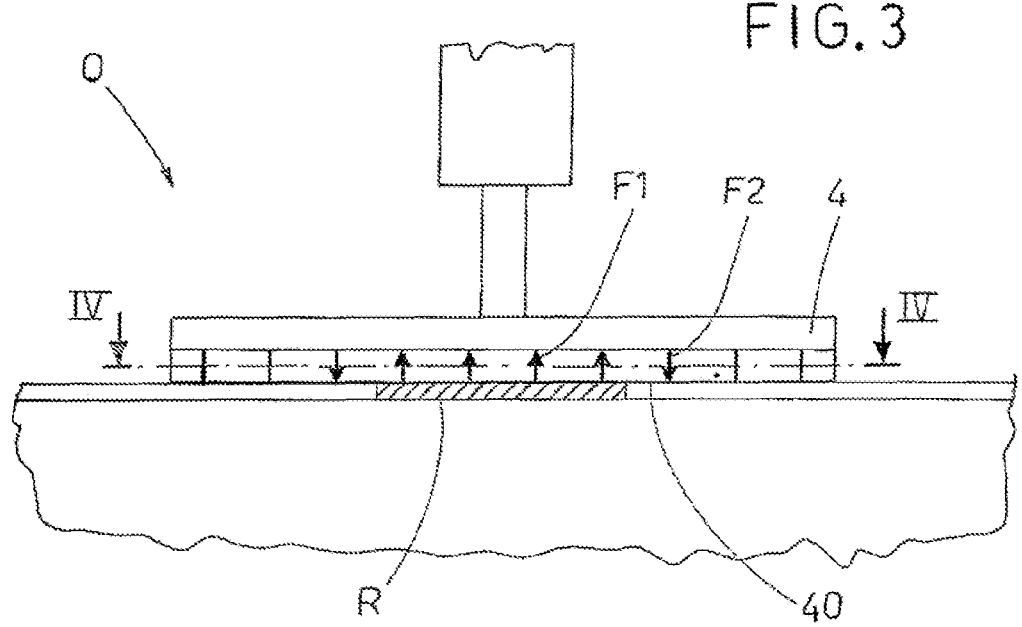
FIG. 3 is a larger-scale lateral view of an operating position of a part of the device of the invention.

The collecting group 4, following the cutting of the portions from the leather 10, passes from a non-operative position (FIG. 1A), in which it is raised with respect to the work plane 2, to a first position O (FIG. 3) in which the removing group 4 is lowered with the relative lower surface 40 adhering to a selected portion R to be removed.

The command and control board C, in phase relation with the first position O set by the collecting group 4, connects, by activating first valves V, the aspirating source D to the hole F1 facing the surface of the portion R to be removed; connects, by activating second valves V1, the compressed-air source P to the holes F2 facing the strip of the leather W delimiting the border of the portion R and maintains the connections with the remaining holes F3 interesting the collecting group 4 inactive. The remaining holes F3 are, therefore, connected with the external environment.

In a variant, the remaining holes F3 are also connected to the compressed-air source P.

Figure 5:
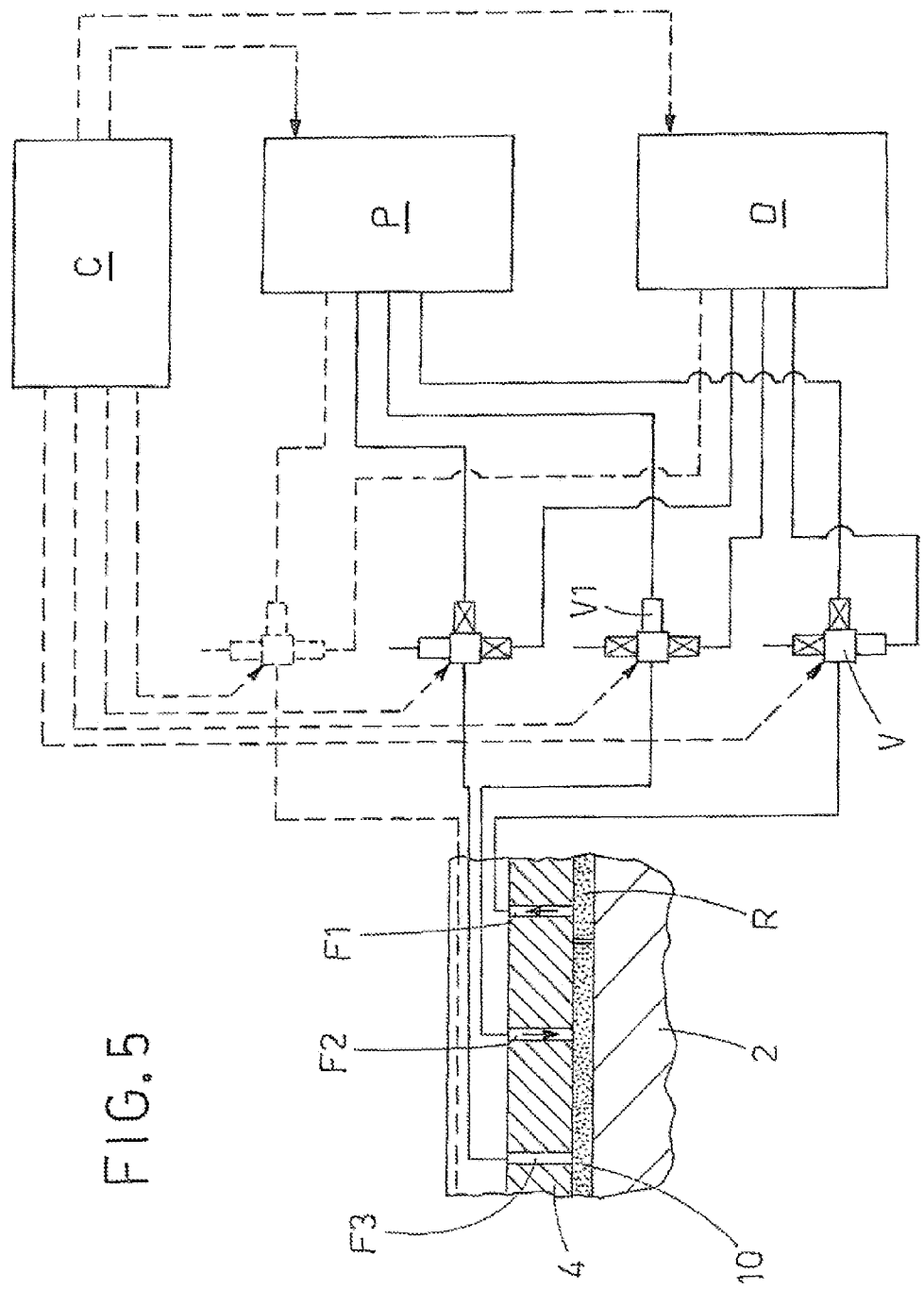
FIG. 5 Is a view of section V-V of FIG. 4, schematically highlighting the connection between a control board and the operating means of the device of the invention.

It follows that the upper surface of the selected portion R is subjected to an aspirating action, and the upper surface of the strip W of the leather which surrounds the portion R is subjected to a blowing action from above in a downwards direction (FIG. 5); the selected portion R is engaged to the collecting group 4, while the flaps of the remaining adjacent portions, provided in the strip W of the leather surrounding the profile of the portion R, are maintained in contact against the work plane 2.

The collecting group 4 displaces upwards and, in phase relation with this displacement, the holes F2 facing the strip of the leather are disconnected from the corresponding compressed-air source P following the deactivation of the second valves V1.

The manipulator 31 is moved to define a second operating position, not illustrated, in which the collecting group 4 and the portion R supported thereby is positioned above a corresponding collection container T.

The holes F1 facing the surface of the selected portion are disconnected from the corresponding aspirating source D following the deactivation of the first valves V and thus the portion R falls into the corresponding container T.

The collecting group 4 is newly arranged above the work plane 2 such as to remove a second portion from the work plane 2 and unload it as described above, into a corresponding collection container.

The device of the invention is particularly advantageous due to its constructional simplicity.

The activation in phase relation with the aspirating source D and the compressed-air source P to selected holes in the same collecting group 4 is advantageous, as the portion R to be removed is subjected to an aspirating action directed upwards such as to guarantee adhering engagement of the portion R to the collecting group 4, and the flow of air generated by the compressed-air source P is such that the upper surface of the strip W of the leather delimiting the border of the portion R is subjected to a blowing action directed downwards such as maintain the strip of leather bordering the selected portion R pressed on the work plane.

The device, therefore, enables engaging a determined cut portion and unloading it into suitable containers, as the command and control board C, on the basis of the profile of the precedingly-cut portion and subsequently selected such as to be unloaded from the work plane, intervenes to select and activate the holes of the removing group 4 contained internally of the profile of the portion to be collected, and to select and activate the holes which border the external profile of the portion to engage only the selected portion and avoid removing the flaps of adjacent portions fashioned in the strip of the leather bordering the selected portion.

The activation in phase relation with the aspirating source D and the compressed-air source P, respective connected to the holes of the collecting group internal of and adjacent to the profile of the selected portion R avoids, as evidenced above, engaging the flaps of the portions adjacent to the selected portion, thus avoiding the flaps being raised, detached from the waste and left to fall in a disordered way onto the work plane with all the drawbacks which that would involve in later collections.

The non-activation of the holes of the sections of the collecting group not interested by the selected portion, and by the virtual border surrounding the portion A is advantageous as the remaining part of the leather of the article underlying the surface of the collecting group 4 is not subjected to any action that can act to obstruct the collecting of the selected portion.

As specified in the preamble, the work plane 2 is defined by zones interested by first holes selectively connectable to the aspirating source during the cutting operation and deactivated following the cutting operation.

Figure 6:
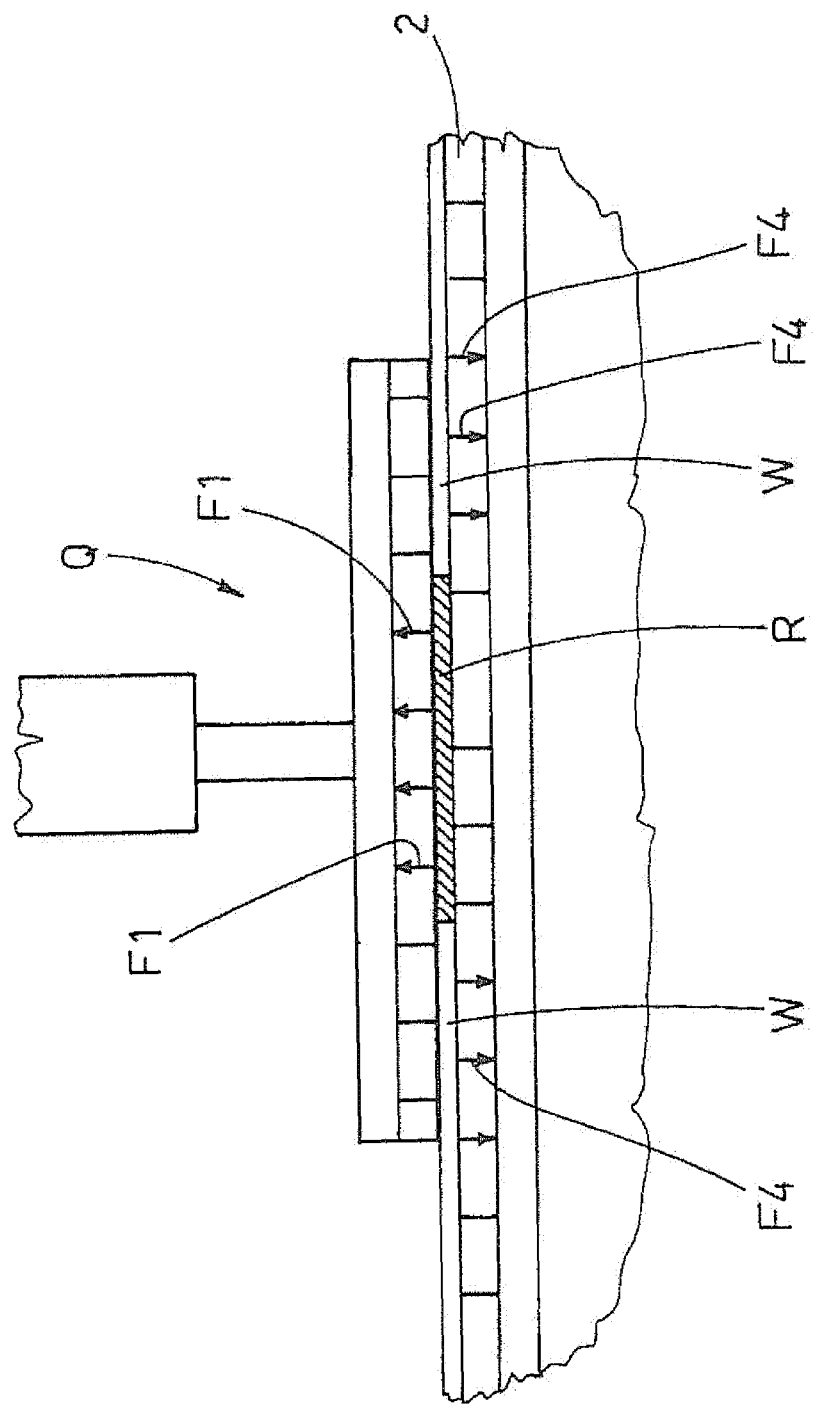
FIG. 6 is a larger-scale lateral view of a variant of the device of the invention.
Figure 7:
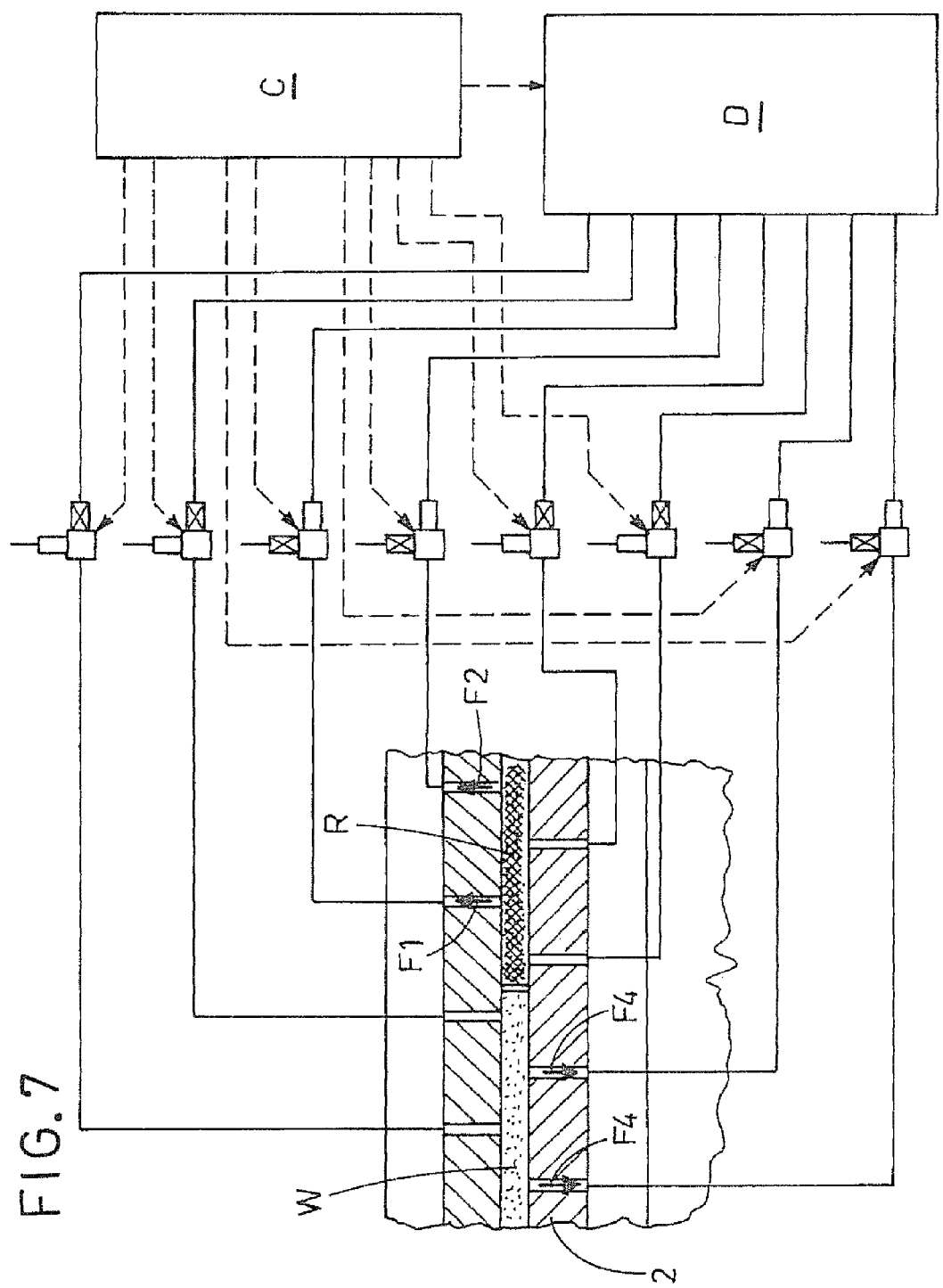
FIG. 7 illustrates the same view as in section V-V of FIG. 4, relating to the variant.

In a variant (see FIGS. 6, 7) the work plane 2 is subdivided into sections interested by relative through-holes F4, connectable to the aspirating source D.

Following the first position O of the collecting group 4 the command and control boar C connects, in phase relation, the aspirating source to the holes F of the collecting group facing the surface of the selected portion R as well as the holes F4 of the work plane 2, covered by the leather which border the profile of the portion to be collected, i.e. the holes F4 covered by the strip W.

It follows that the upper surface of the portion R to be collected is subjected to an upwards aspirating action, such that the portion R is engaged adheringly to the collecting group 4, and the lower surface of the strip W of the leather surrounding the portion R is subjected to a downwards aspirating action, such that this part of the leather remains adhering to the work plane 2: this enables the collecting group to engage adheringly to only the selected portion.

Further, it is noteworthy that it is possible, on the basis of the dimensions of the selected portion R, to select all or a fraction of the holes F1, facing the upper surface of the portion R, and all or a fraction of the holes F4 of the work plane 2 covered by the strip W of the sheet.

The above has been described by way of non-limiting example; therefore, any modifications in detail, and variations in shapes and dimensions of the described components are understood to fall within the scope of protection, as set out in the claims.

The invention claimed is:

1. A device for selective collecting of portions removed by cutting from a sheet arranged on a work plane comprising:
    a cutting unit, cooperating with the work plane in order to cut a selected portion from the sheet resting thereon;
    at least two collecting containers, arranged to receive cut portions according to predefined ordering criteria;
    a removing group, subdivided into sections, each section having holes opening into a lower surface of the removing group, the device including at least one first valve and at least one second valve connected to the holes of each section, the holes of each section being connectable selectively either to an aspirating source by the at least one first valve or a compressed-air source by the at least one second valve;
    an activator configured for moving the removing group to a first position in which the lower surface of the removing group is adhered onto the sheet on the work plane so that a first plurality of the holes of the sections faces an upper surface of the selected cut portion and a second plurality of the holes of the sections faces an upper surface of a strip of the sheet which delimits a border of the selected cut portion, and a second position in which the removing group is situated above one of the collecting containers;

a command and control board for commanding the activator, the aspirating source and the compressed-air source, the command and control board being predisposed and configured to connect, in phase relation with the moving of the removing group into the first position, the aspirating source with the first plurality of holes facing the upper surface of the selected cut portion, and the compressed-air source with the second plurality of holes facing the upper surface of the strip of the sheet which delimits a border of the selected cut portion, so that the upper surface of the selected cut portion is subjected to an aspirating action directed upwards and the upper surface of the strip is subjected to a blowing action directed downwards, and to raise the removing group actuated in phase relation with a disconnecting of the compressed-air source from the second plurality of holes facing the strip, and a consequent engaging of only the selected cut portion to the removing group by the upwards aspirating action via the first plurality of holes, and to move the removing group to position the group superiorly of a corresponding one of the collecting containers, and to disconnect the first plurality of holes facing the upper surface of the selected cut portion from the aspirating source, to release the selected cut portion from the removing group, for deposit into the corresponding one of the collecting containers.

2. The device of claim 1, wherein the removing group includes a plate which has dimensions that are not smaller than dimensions of a largest portion to be cut from the sheet.

3. The device of claim 1, wherein the activator comprises a manipulator which bears the removing group.

* * * * *